No. 802,798. PATENTED OCT. 24, 1905.
H. C. BURNETT.
ANTIFRICTION BEARING.
APPLICATION FILED MAR. 25, 1904.
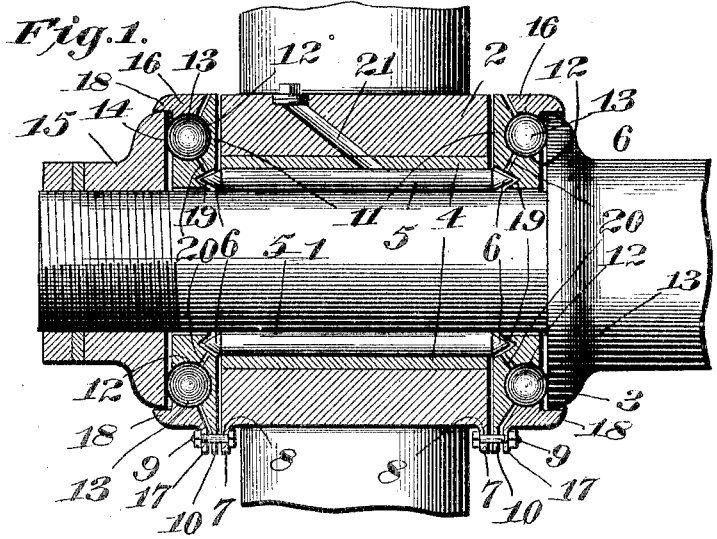
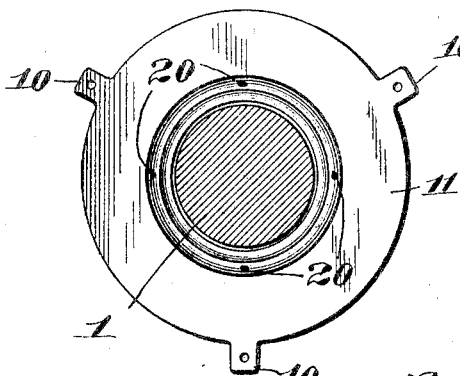
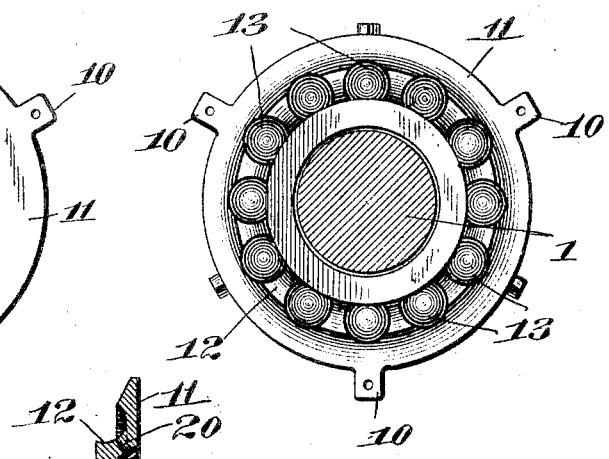
WITNESSES:
Elmer Leavey
INVENTOR
Henry Cundiff Burnett
BY
Henry N. Copp
his Attorney

UNITED STATES PATENT OFFICE.

HENRY CUNDIFF BURNETT, OF FORT MAGINNIS, MONTANA.

ANTIFRICTION-BEARING.

No. 802,798.        Specification of Letters Patent.        Patented Oct. 24, 1905.

Application filed March 25, 1904. Serial No. 199,933.

*To all whom it may concern:*

Be it known that I, HENRY CUNDIFF BURNETT, a citizen of the United States, residing at Fort Maginnis, county of Fergus, and State of Montana, have invented certain new and useful Improvements in Antifriction-Bearings, of which the following is a specification.

My invention relates to antifriction-bearings, and more especially to that class which are employed for vehicle-hubs, although the device may be used in connection with almost any kind of machinery where antifriction-bearings are needed.

The device especially relates to that class of bearings known to those familiar with the art as "circular series, combined ball and roller."

The object of the invention is to provide a bearing which will overcome the great difficulty of enforced friction and at the same time be practically dust-proof.

A further object of the invention is the provision of means whereby the entire set of bearings is oiled from one source.

A still further object of the invention is to provide novel means in which the dust-cap and ball-retainers are combined; and the invention consists in novel features and combination of parts, which will be more fully hereinafter described, and pointed out in the appended claims.

The accompanying drawings are to be considered in connection with the following specification, and in which—

Figure 1 is a longitudinal section through said bearing. Fig. 2 is an end view with the ball-bearing and the dust-cap removed. Fig. 3 is an end view with only the dust-cap removed, and Fig. 4 is a detail section of the ball-bearing separated from the hub.

The invention consists, as usual, of the ordinary spindle 1, which is adapted to enter the hub 2 and which is provided with shoulders 3. The hub 2 is provided with the ordinary skein 4. Interposed between the skein 4 and the spindle 1 are rollers 5, having pointed ends 6. Secured to the hub and projecting therefrom is a plurality of lugs 7, provided with holes 8, and secured to these lugs by means of a bolt 9 and similar lugs 10 are circular ball-caps 11, having semicircular ball-races 12, in which are seated balls 13, adapted to engage the shoulder 3 of the spindle 1 and similar shoulder 14 on a nut 15, which is secured on the outer end of the spindle.

16 represents a ball-retainer having lugs 17, adapted to register with the lugs 7 and 10 and be held in place by the bolt 9. This retainer is provided with an overhanging flange 18, which lies in close proximity and overlaps shoulders 3 and 14 at the respective ends of the bearing and acts as a dust-guard.

The ball-cups 11 are provided at 19 with annular V-shaped races adapted to receive the conical ends 6 of the rollers 5, and intersecting said races and communicating therewith and with the ball-race 12 are oil-openings 20, adapted to convey oil from the main oil-tubes 21, of which there are three, to the balls 13.

The device is assembled by placing the bearing 11 on the inner end of the hub and then inserting the balls in their proper position. The ball-retaining ring on the inner end is now placed in position and secured by the bolt 9, after which the spindle is put through the hub and the rollers 5 are placed in position. After this the bearing 11 of the opposite end is placed in position, and the balls 13 are then inserted, after which a similar retaining-ring is secured to the hub and the nut 15 secured into position.

Having thus described my invention, what I claim as new, and desire to secure by Letters Patent, is—

1. In an antifriction-bearing, the combination with a hub having a plurality of lugs, a spindle mounted within said hub and bearing elements secured to said hub and provided with lugs adapted to register with the lugs on the hub, said bearing elements each having a ball-race, of balls within said races, flanges carried by the spindle adapted to engage said balls, one of said flanges being removable, retaining-rings for said balls provided with a dust-guard adapted to overhang said spindle-flanges and having lugs adapted to register with the before-mentioned lugs, and bolts engaging all of said lugs adapted to hold the component parts in their relative positions.

2. The combination of a hub, a spindle within said hub, and provided with flanges, one of said flanges being removable, bearing elements removably secured to said hub and provided with a ball-race, balls within said races adapted to be engaged by the flanges upon the spindle, retaining-rings removably secured to said hub and having outwardly-extending integral flanges secured thereto and adapted to overhang the flanges on the spindle and to act as dust-guards, said outwardly-extending integral flanges projecting in a line parallel with the spindle.

In testimony whereof I hereunto affix my signature in presence of two witnesses.

HENRY CUNDIFF BURNETT.

Witnesses:
P. C. HEATH,
N. J. PIPER.